(12) United States Patent
Guo et al.

(10) Patent No.: US 8,745,606 B2
(45) Date of Patent: Jun. 3, 2014

(54) CRITICAL SECTION ORDERING FOR MULTIPLE TRACE APPLICATIONS

(75) Inventors: Xiaofeng Guo, Shanhai (CN); Jinquan Dai, Shanghai (CN); Long Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1590 days.

(21) Appl. No.: 11/863,703

(22) Filed: Sep. 28, 2007

(65) Prior Publication Data

US 2009/0089765 A1    Apr. 2, 2009

(51) Int. Cl.
*G06F 9/45*    (2006.01)
(52) U.S. Cl.
CPC ..................................... *G06F 8/443* (2013.01)
USPC .......................................................... 717/156
(58) Field of Classification Search
CPC ....................................................... G06F 8/443
USPC .......................................................... 717/156
See application file for complete search history.

(56) References Cited

U.S. PATENT DOCUMENTS

2005/0108695 A1* 5/2005 Li et al. ........................ 717/144
2006/0136878 A1* 6/2006 Raghunath et al. ........... 717/130

OTHER PUBLICATIONS

U.S. Appl. No. 11/662,217, filed Mar. 8, 2007, entitled "Method and Apparatus for Ordering Code Based on Critical Sections," by Long Li, et al.

* cited by examiner

*Primary Examiner* — Wei Zhen
*Assistant Examiner* — Lanny Ung
(74) *Attorney, Agent, or Firm* — Trop, Pruner & Hu, P.C.

(57) ABSTRACT

Critical sections in a programming code may be ordered based at least in part on code motions. A flow graph of the code including the critical section may be generated. Two initiative motions may be performed based on the flow graph to identify possible positions of critical codes in the flow graph. Dependence relationship of critical sections may be determined based on the positions of critical sections. Using the dependence relationship information, the order of critical sections may be determined. The determined order of critical sections may be further used by a compiler to perform optimizations for the code.

19 Claims, 6 Drawing Sheets

CRITICAL SECTION ORDERING FOR MULTIPLE TRACE APPLICATIONS

BACKGROUND

1. Field

This disclosure relates generally to compiling technologies in a computing system, and more specifically but not exclusively, to code optimization techniques.

2. Description

Multithreading and multiprocessing are common programming techniques often used to maximize the efficiency of computer programs by providing a tool to permit concurrency or multitasking. Threads are ways for a computer program to be divided into multiple and distinct sequences of programming instructions where each sequence is treated as a single task and to be processed simultaneously.

One example application that may use the multithreaded programming technique is a packet-switched network application that processes network packets in a high speed packet-switched system concurrently. To maintain and organize the different packets, a new thread may be created for each incoming packet. In a single processor environment, the processor may divide its time between different threads. In a multiprocessor environment, different threads may be processed on different processors. For example, the Intel® IXA™ network processors (IXPs) have multiple microengines (MEs) processing network packets in parallel where each ME supports multiple threads.

In such a parallel programming paradigm, accesses to shared resources, including shared memory, global variables, shared pipes, and so on, are typically be protected by critical sections to ensure mutual exclusiveness and synchronizations between threads. Normally, critical sections are created by using a signal mechanism in a multiprocessor system. A signal may be used to permit entering or to indicate exiting of a critical section. For instance, in an Intel® IXP™, packets are distributed to a chain of threads in order (i.e., an earlier thread in the chain processes an earlier packet). Each thread waits for a signal from the previous thread before entering the critical section. After the signal is received, the thread executes the critical section code exclusively. Once this thread is done, it sends the signal to the next thread after leaving the critical section.

Due to the cost of hardware, the number of signals that can be used for critical sections is limited by the scale of processing element in a computing system. In order for the signal resource to be used more effectively, critical section merge is typically performed by a compiler when optimizing a code. On the other hand, the size of a critical section also affects the performance of a programming code. Typically the larger a critical section is, the longer the shared resource access latency is. Additionally, a small sized critical section is normally easier to be hidden by technologies such as multi-threading than a large-sized critical section. Hence, a compiler also performs critical section minimization in addition to critical section merge when optimizing a code. Code motion techniques may be used to at least partly merge critical sections and reduce sizes of critical sections. To merge critical sections, it is desirable to first determine the order of critical sections since the order of critical sections may be different across different traces.

BRIEF DESCRIPTION OF THE DRAWINGS

The features and advantages of the disclosed subject matter will become apparent from the following detailed description of the subject matter in which.

DETAILED DESCRIPTION

According to embodiments of the subject matter disclosed in this application, critical sections may be ordered based at least in part on code motions when optimizing a code. A flow graph of a program including the critical section may be generated. Two initiative motions may be performed based on the flow graph to identify positions of critical codes in the flow graph. Dependence relationship of critical sections may be determined based on the positions of critical sections. Using the dependence relationship information, the order of critical sections may be determined. The determined order of critical sections may be further used by a compiler to perform optimizations for the code.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
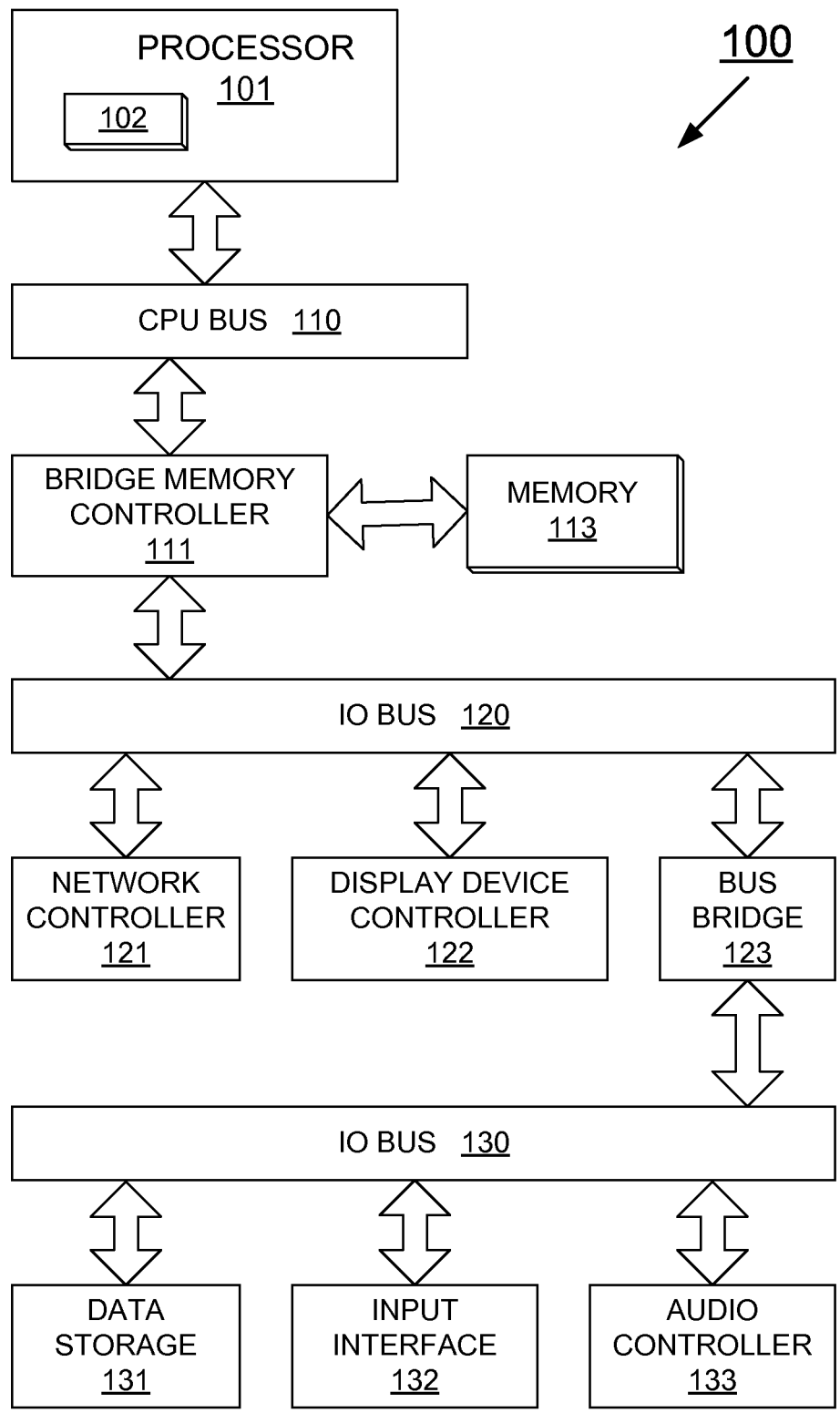
FIG. 1 is a block diagram of an exemplary computing system in which an example embodiment of the subject matter disclosed in the present application may be implemented.

FIG. 1 is a block diagram of an exemplary computing system 100 in which an example embodiment of the subject matter disclosed in the present application may be implemented. The computing system 100 includes a processor 101 that processes data and a memory 113. The processor 101 may have multiple or many processing cores (for brevity of description, term "multiple cores" will be used hereinafter to include both multiple processing cores and many processing cores). The processor 101 may be a complex instruction set microprocessor, a reduced instruction set computing microprocessor, a very long instruction word computer microprocessor, a processor implementing a combination of instruction sets, or other processor device. FIG. 1 shows the computing system 100 with a single processor. However, it is understood that the computing system 100 may operate with multiple processors. Additionally, each of the one or more processors may support one or more hardware threads. The processor 101 is coupled to a CPU (Central Processing Unit) bus 110 that transmits data signals between processor 101 and other components in the computing system 100.

The memory 113 may be a dynamic random access memory ("DRAM") device, a static random access memory ("SRAM") device, read-only memory ("ROM"), a synchronous DRAM ("SDRAM") device, a Double Data Rate ("DDR") SDRAM device, and/or other memory device. The memory 113 may store instructions and code represented by data signals that may be executed by the processor 101. According to an embodiment of the computing system 100, a compiler may be stored in the memory 113 and implemented by the processor 101 in the computing system 100. According to an embodiment of the subject matter disclosed in this application, the compiler may derive the flow graph of a program including multiple critical sections with multiple traces. Two initiative motions may be performed based on the flow graph to identify positions of critical codes in the flow graph. Dependence relationship of critical sections may be determined based on the positions of critical sections. Using the dependence relationship information, the order of critical sections may be determined. The determined order of critical sections may be further used by a compiler to perform optimizations for the code.

A cache 102 may reside inside processor 101 to store data stored in memory 113. The cache 102 speeds access to memory by the processor 101 by taking advantage of its locality of access. In an alternative embodiment of the computing system 100, the cache 102 may reside external to the processor 101. In another embodiment, the cache 102 may include multiple levels, such as level 1 cache (L1 cache), level 2 cache (L2 cache), level 3 cache, and so on, with one or more levels (e.g., L1 cache) residing inside the processor 101 and others residing outside the processor 101. A bridge memory controller 111 directs data signals between the processor 101, the memory 113, and other components in the computing system 100 and bridges the data signals between the CPU bus 110, the memory 113, and a first IO (Input/Output) bus 120.

The first IO bus 120 may be a single bus or a combination of multiple buses. The first IO bus 120 provides communication links between components in the computer system 100. A network controller 121 may be coupled to the first IO bus 120. The network controller 121 may link the computing system 100 to a network of computers (not shown) and support communication among the computers. A display device controller 122 may be coupled to the first IO bus 120. The display device controller 122 allows coupling of a display device (not shown) to the computing system 100 and acts as an interface between the display device and the computing system 100.

A second IO bus 130 may be a single bus or a combination of multiple buses. The second IO bus 130 may provide communication links between components in the computing system 100. A data storage device 131 is coupled to the second IO bus 130. The data storage device 131 may be hard disk drive, a floppy disk drive, a compact disc ("CD") ROM device, a flash memory device or other mass storage device. An input interface 132 may be coupled to the second IO bus 130. The input interface 132 may be, for example, a keyboard and/or mouse controller to other input interface. The input interface 132 may be a dedicated device or can reside in another device such as a bus controller or other controller. The input interface 132 allows coupling of an input device to the computing system 100 and transmits data signals from an input device to the computing system 100. An audio controller 133 may be coupled to the second IO bus 130. The audio controller 133 operates to coordinate the recording and playing of sounds by a device such as an audio codec which is also coupled to the IO bus 130. A bus bridge 123 couples the first IO bus 120 and the second IO bus 130. The bus bridge 123 operates to buffer and bridge data signals between the first IO bus 120 and the second IO bus 130.

When a program is executed in the computing system 100, it may be executed in multiple threads. In one embodiment, all of the threads may be running on processor 101. In another embodiment, threads may be distributed and run on multiple processor or processing cores. Threads communicate to other threads through shared resources such as global memory, registers, or signals. In many instances, the shared resource may only be accessed by one thread. Such an exclusive access of the shared resource by one thread at a time may be implemented by using a critical section. A conventional method to implement a critical section is to use a signal mechanism. A thread may enter a critical section after receiving a signal and exiting the critical section by notifying the next thread that it is done and by passing a signal to the next thread. Typically, it is desirable to merge critical sections to reduce the number of signals being used and to minimize sizes of critical sections to reduce the latency of shared resource access. In a multiple trace application the order of critical sections needs to be determined so that critical section merger and minimization can be efficiently performed.

Figure 2:
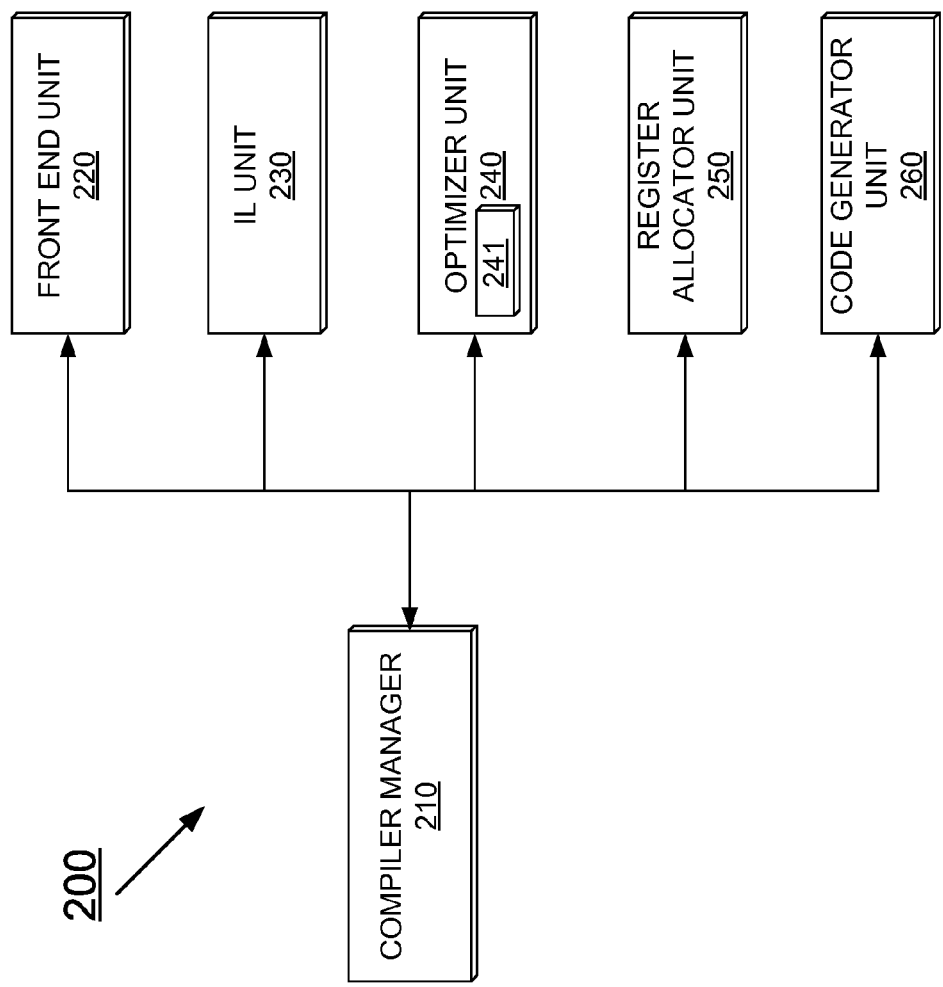
FIG. 2 is a block diagram that illustrates a compiler according to an example embodiment of the subject matter disclosed in the present application.

FIG. 2 is a block diagram that illustrates a compiler 200 according to an example embodiment of the subject matter disclosed in the present application. The compiler 200 may include a compiler manager 210. The compiler manager 210 receives source code to compile. The compiler manager 210 interfaces with and transmits information between other components in the compiler 200.

The compiler 200 may include a front end unit 220. According to an embodiment of the compiler 200, the front end unit 220 operates to parse source code and convert it to an abstract syntax tree. The compiler 200 may also include an intermediate language ("IL") unit 230. The IL unit 230 transforms the abstract syntax tree into a common intermediate form such as an intermediate representation. It should be appreciated that the IL unit 230 may transform the abstract syntax tree into one or more common intermediate forms.

The complier may include an optimizer unit 240. The optimizer unit 240 may utilize one or more optimization procedures to optimize the intermediate representation of the code. According to an embodiment of the compiler 240, the optimizer unit 240 may perform peephole, local, loop, global, interprocedural and/or other optimizations. According to an embodiment of the compiler 240, the optimizer unit 240 includes a critical section ordering apparatus 241. The critical section ordering apparatus may perform two initiative motions based on the flow graph of a program to identify positions of critical codes in the program that include multiple critical sections with multiple traces. The critical section ordering apparatus may determine the dependence relationship of critical sections based on the positions of critical sections. Using the dependence relationship information, the critical section ordering apparatus may determine the order of critical sections. The determined order of critical sections may be further used by a compiler to perform optimizations for the code.

The compiler 200 may include a register allocator unit 250. The register allocator unit 250 identifies data in the intermediate representation that may be stored in registers in the processor rather than in memory. Additionally, the compiler 200 may include a code generator 260. The code generator 260 converts the intermediate representation into machine or assembly code.

Figure 3:
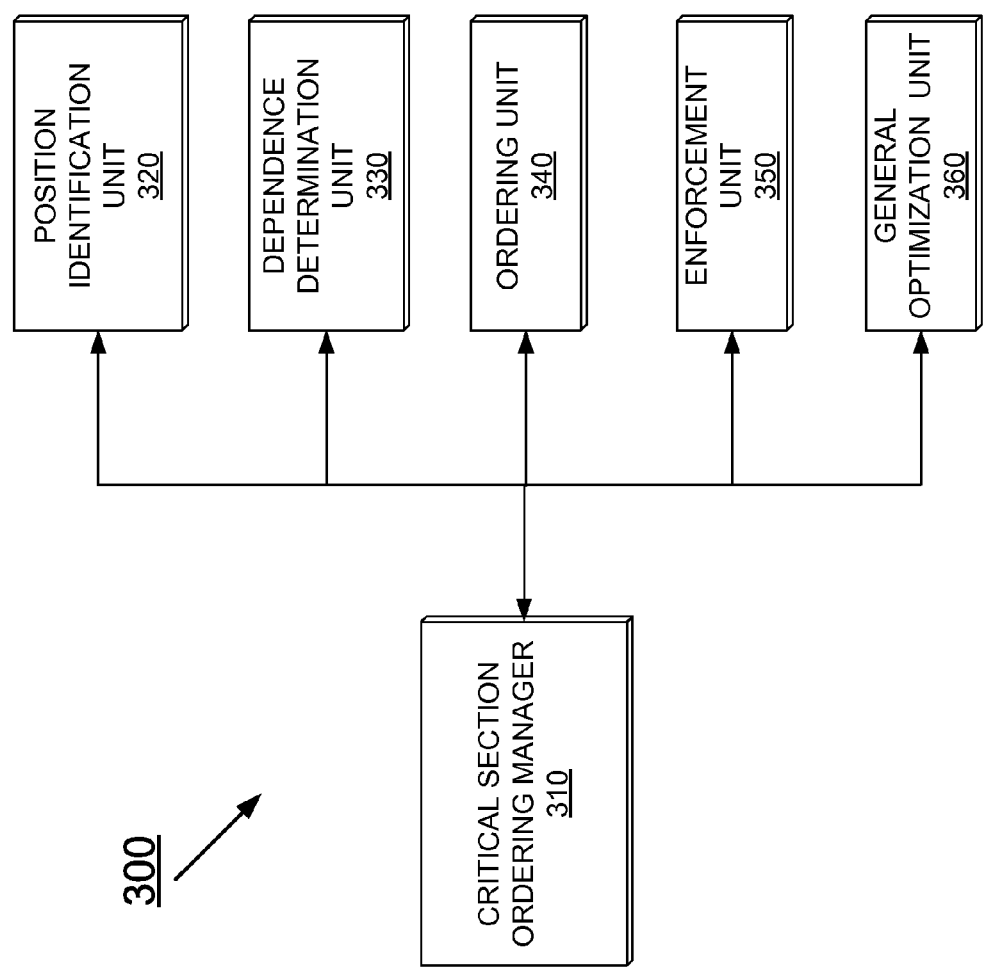
FIG. 3 is a block diagram of an exemplary critical section ordering apparatus according to an example embodiment of the subject matter disclosed in the present application.

FIG. 3 is a block diagram of an exemplary critical section ordering apparatus 300 according to an example embodiment of the subject matter disclosed in the present application. The critical section ordering apparatus 300 may be used to implement the critical section ordering apparatus 241 shown in FIG. 2. The critical section ordering apparatus 300 includes a critical section ordering manager 310. The critical section ordering manager 310 interfaces with and transmits information between other components in the critical section ordering apparatus 300.

Figure 4C:
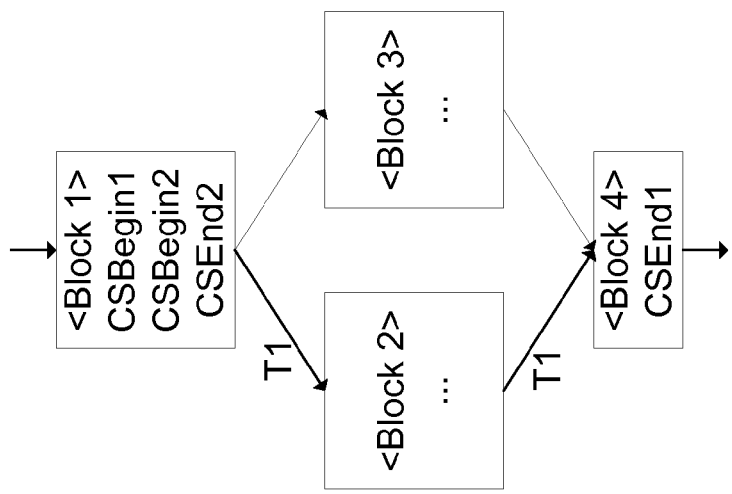
FIGS. 4A, 4B and 4C illustrate an example of performing initiative motions to identify positions of critical sections according to an example embodiment of the subject matter disclosed in the present application.
Figure 4B:
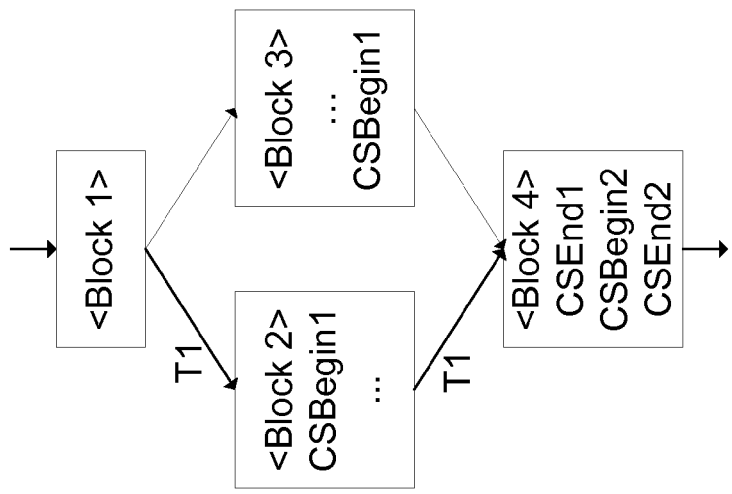
Figure 4A:
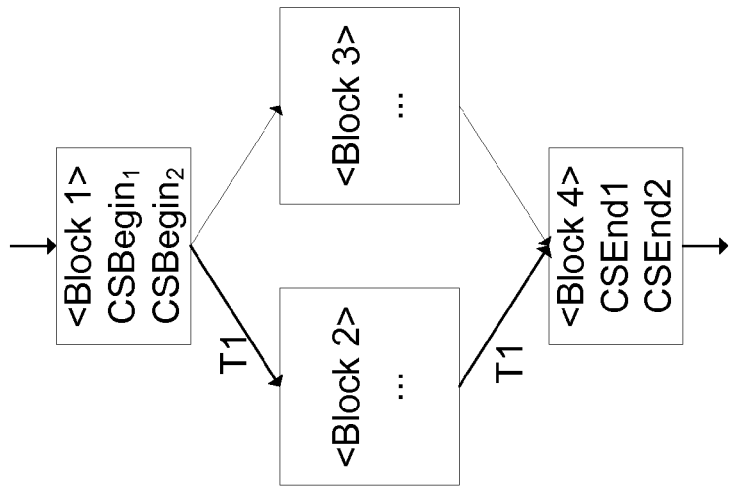

Critical section ordering apparatus 300 may include a position identification unit 320. The position identification unit 320 may receive a flow graph of a program having multiple critical sections with multiple traces. The position identification unit 320 may perform two initiative motions for instructions in the program—"code sink" and "code hoist." FIGS. 4A, 4B, and 4C illustrate an example of two initiative motions according to an example embodiment of the subject matter disclosed in the present application. FIG. 4A shows the original flow graph 400 of an example code. The original flow graph 400 shows that there are two critical sections: CS #1 and CS #2. CS #1 starts with CSBegin1 in block 1 and ends with CSEnd1 in block 4. CS #2 starts with CSBegin2 in block 1 and ends with CSEnd2 in block 4. FIG. 4B shows a flow graph 430 after an initiative motion—code sink of the example code. The code sink motion keeps all of the CSEnd's at the last block of the flow graph and sinks all of the CSBegin's as low as possible in the flow graph. After code sink, CSBegin1 is moved from block 1 and block 2; while CSBegin2 is moved to block 4 after CSEnd1 but before CSEnd2. From flow graph 430, the lowest possible positions of CSBegin's across different traces may be obtained.

FIG. 4C shows a flow graph 470 of the example code after another initiative motion—code hoist. The code hoist motion keeps all CSBegin's at the top of the flow graph and hoist all of the CSEnd's as high as possible. After the code hoist motion, CSBegin1 and CSBegin2 remain in block 1; CSEnd2 is moved from block 4 to block 1 and is placed after CSBegin2; CSEnd1 remains in block 4. From flow graph 470, the highest possible positions of CSEnd's across different traces may be obtained. Note that the structure of flow graphs 400, 430, and 470 remains the same, i.e., relationship between code blocks are the same for flow graphs 400, 430, and 470. What is different among flow graph 400, 430, and 470 is what is inside each code block. For example, what block 1 includes in flow graph 400 is different from what is included in block 1 in flow graph 430, which is also different from what is included in block 1 in flow graph 470. Such unchanged block-level flow graph may be referred to as control flow graph.

After two initiative motions, it can be found that the lowest possible position for CSBegin1 is block 2 and the highest possible position for CSEnd1 is block 4. It can also be found that the lowest possible position for CSBegin2 is block 4 and the highest possible position for CSEnd2 is block 1.

Returning to FIG. 3, critical section ordering apparatus 300 also includes a dependence determination unit 330 to determine the dependence relationship among critical sections based on the position results obtained from position determination unit 320. Two reasonable decisions for ordering critical sections may be made after obtaining the position information of critical sections. First, for the $i^{th}$ critical section, if the lowest possible position of $CSBegin_i$ ($CBLow_i$) is higher than the highest possible position of $CSEnd_i$ ($CEHigh_i$) on a single trace, the minimal critical section on this trace must be from $CBLow_i$ to $CEHigh_i$ assuming the control flow graph remains the same. In other words, it is impossible to move $CSBegin_i$ lower than $CBLow_i$ and to move $CSEnd_i$ higher than $CEHigh_i$. Second, for the $i^{th}$ critical section, if the lowest possible position of $CSBegin_i$ ($CBLow_i$) is lower than the highest position of $CSEnd_i$ ($CEHigh_i$) on a single trace, the minimal critical section on this trace must be in a single block. In this situation, if $CSBegin_i$ is moved to any block b on this trace ranged from $CEHigh_i$ to $CBLow_i$, $CSEnd_i$ may be moved to block b too.

Based on these two decisions, dependence relationships may be added into critical section a dependence graph using a formula such as:

If ($CBLow1 < CEHigh2$), add dependence $CS1 \rightarrow CS2$;

If ($CBLow2 < CEHigh1$), add dependence $CS2 \rightarrow CS1$.

In other words, if the condition "$CBLow1 < CEHigh2$" is met, it means that it is impossible to sink CS1 after CS2, and the best order for these two critical sections should be (CS1, CS2). To enforce this order, a dependence $CS1 \rightarrow CS2$ may be added. Similarly, when the condition "$CBLow2 < CEHigh1$" is met, it means that it is impossible to hoist CS1 before CS2, and the best order for these two critical sections should be (CS2, CS1). To enforce this order, a dependence $CS2 \rightarrow CS1$ may be added to the dependence graph of critical sections.

The dependence relationships among different critical sections may be inserted into the dependence graph on a single trace. In addition, critical section dependence relationships on multiple traces may be inserted into the dependence graph trace by trace. If two critical section relationship on a trace is affected by another trace, these two dependence relationships of the two critical sections on the two trances should be consistent because they are both obtained based on the same initiative motions. Thus, it is possible to add two consistent dependence relationships of two critical sections on two traces on the same dependence graph. On the other hand, if two critical sections relationships on different traces are irrelative to each other, both dependence relationships may be added to the dependence graph. Hence, dependence relationships obtained using the method disclosed above may be applied to multiple trace situations.

Figure 5B:
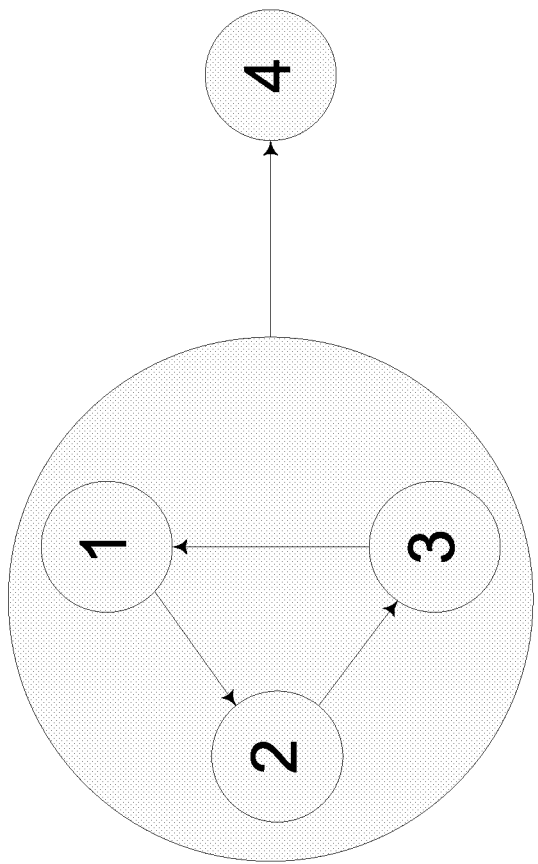
FIGS. 5A and 5B illustrate an example of determining the order of critical sections, according to an example embodiment of the subject matter disclosed in the present application.
Figure 5A:
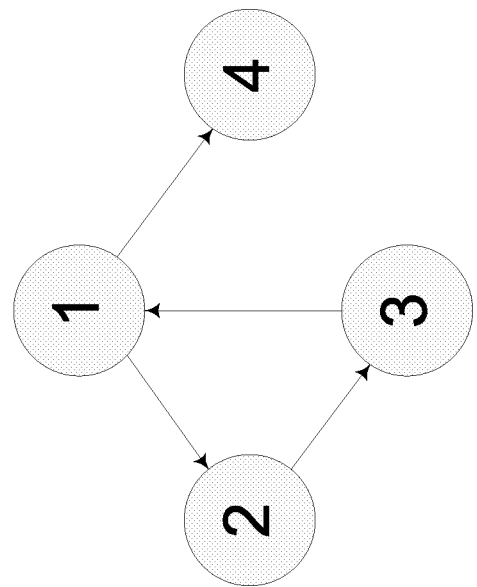

Critical section ordering apparatus 300 may also include an ordering unit 340 to determine the order of critical sections across different traces. The ordering unit summarizes the dependence graph obtained from dependence determination unit 330; partitions critical sections into different groups; and decides the order of these groups. This is an order summary of all these critical sections. FIGS. 5A and 5B illustrate an example of determining the order of critical sections based on a dependence graph obtained from dependence determination unit 330, according to an example embodiment of the subject matter disclosed in the present application. FIG. 5A shows a dependence graph 500 obtained from dependence determination unit 330. Each node in graph 500 represents a critical section. Ordering unit 34 summarizes all the nodes in graph 500 to derive a summarized dependence graph 550 as shown in FIG. 5B. Graph 550 includes two summarized nodes. From the summarized graph 550, the order of the four critical sections as shown in FIGS. 5A and 5B may be decided, i.e., $(1, 2, 3) \rightarrow (4)$.

Returning to FIG. 3, critical section ordering apparatus 300 may also include a enforcement unit 350 to provide the compiler with the order of critical sections obtained from ordering unit 340; and inform the compiler to enforce the order when perform optimizations for the program code (e.g., critical section merger, critical section minimization, etc.).

Critical section ordering apparatus 300 may also include a general optimization unit 360. The general optimization unit 360 applies general optimization methods such as code scheduling and copy optimizations to hide resource access latency.

Figure 6:
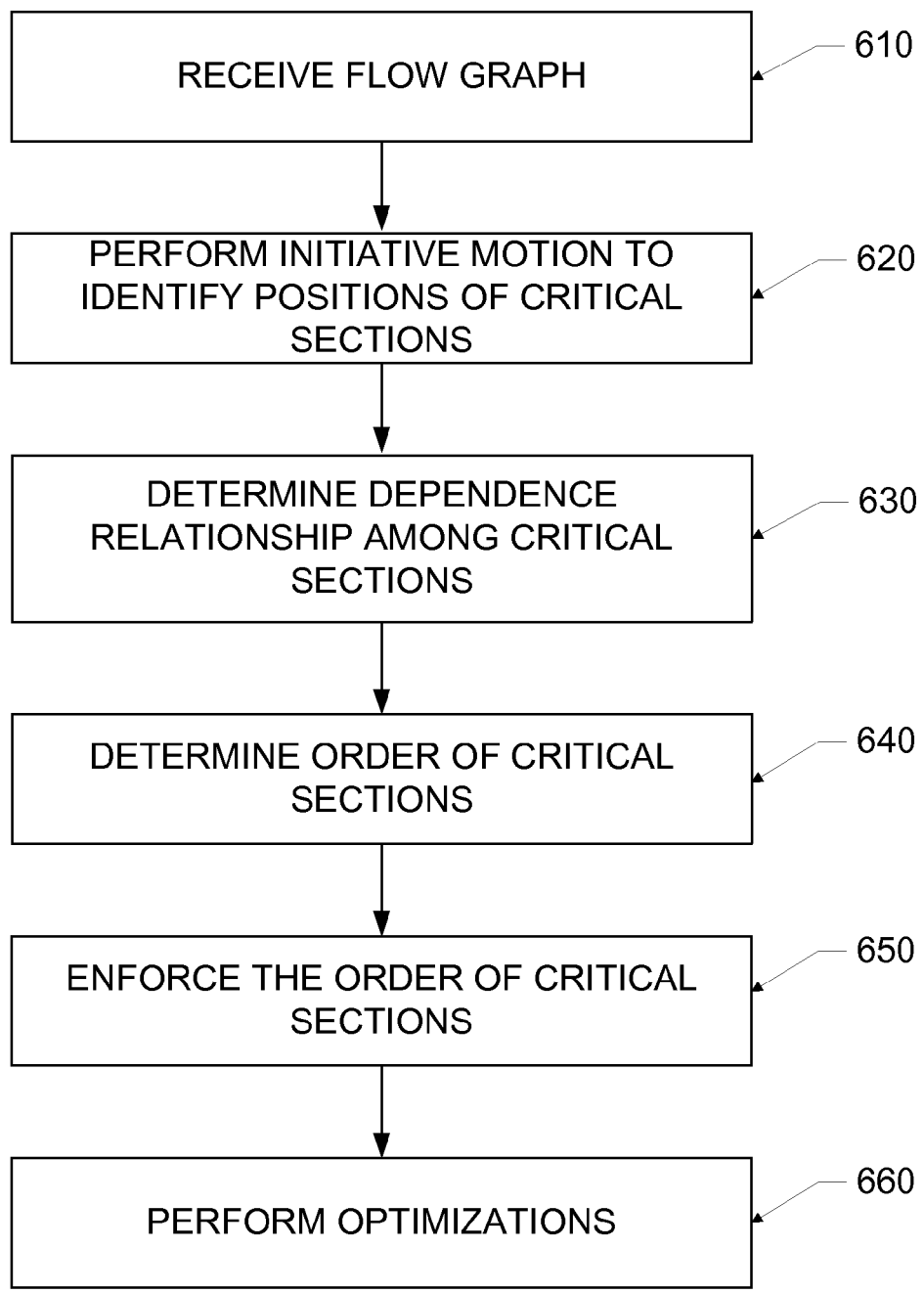
FIG. 6 is a flowchart of one example process for critical section ordering for a multiple trace application, according to an example embodiment of the subject matter disclosed in the present application.

FIG. 6 is a flowchart of one example process 600 for critical section ordering for a multiple trace application, according to an example embodiment of the subject matter disclosed in the present application. At block 610, a flow graph of a program code may be received. At block 620, initiative motions such as code sink and code hoist may be performed to identify possible positions of critical sections on different traces. At block 630, dependence relationships among critical sections on different traces may be obtained based on the possible positions of the critical sections obtained in block 620. At block 640, the order of critical sections may be determined using the dependence information obtained in block 630. At block 650, the determined order of critical sections may be provided to the compiler which then enforces this order when performing optimizations to the program code. At block 660, code optimizations including critical section merger and critical section minimization may be performed.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An article comprising a non-transitory machine-readable medium that contains instructions, which when executed by a processing platform, cause said processing platform to perform operations for compiling programming code with first and second critical sections, the operations including:
   determining a flow graph of the code;
   performing a first code motion on the first critical section based on the flow graph and a second code motion on the second critical section also based on the flow graph;
   determining a dependence relationship between the first and second critical sections based on both of the first and second code motions;
   deriving a dependence graph, using the determined dependence relationship, and summarizing the dependence graph into a summarized dependence graph having a summarized node that includes multiple critical sections; and
   enforcing the dependence relationship between the first and second critical sections when performing optimizations to the code.

2. The article of claim 1, wherein the first code motion includes a code sink motion and the second code motion includes a code hoist motion.

3. The article of claim 1, wherein the operations further comprise: deriving the dependence graph, which includes the first and second critical sections.

4. The article of claim 3, wherein the operations further comprise summarizing the derived dependence graph of the first and second critical sections into the summarized dependence graph.

5. The article of claim 4, wherein the operations further comprise determining an order between the first and second critical sections based on the summarized dependence graph.

6. The article of claim 1, wherein determining the dependence relationship includes determining the dependence relationship between the first and second critical sections across multiple traces.

7. The article of claim 1, wherein the operations further comprise performing at least one of critical section merger or critical section minimization based on the determined dependence relationship.

8. The article of claim 1, wherein the operations further comprise:
   performing another code motion on the first critical section based on the flow graph and an additional code motion on the second critical section also based on the flow graph;
   determining the dependence relationship between the first and second critical sections based on the another code motion and the additional code motion.

9. The article of claim 8, wherein the first code motion includes a sink motion and the another code motion includes a hoist motion.

10. The article of claim 3, wherein the dependence graph includes only critical sections.

11. The article of claim 1, wherein the operations further comprise deriving the dependence graph, which includes an edge between the first and second critical sections.

12. A processor based apparatus, comprising:
   a front end unit to parse source code, received in at least one memory, and to covert the source code to an abstract syntax tree;
   an intermediate language unit to transform the abstract syntax tree into an intermediate representation and store the intermediate representation in the at least one memory;
   and an optimizer unit to optimize the intermediate representation of the source code, the optimizer unit having a processor based critical section ordering apparatus, coupled to the at least one memory, to determine an order between first and second critical sections in the source code and to provide the determined order between the first and second critical sections to the optimizer unit, the optimizer unit using the determined order between the first and second critical sections and enforcing the determined order when performing optimization of the intermediate representation of the source code;
   wherein the critical section ordering apparatus comprises a position identification unit to (a) receive a flow graph of the source code, (b) perform code motions on the first and second critical sections based on the flow graph, and (c) identify positions of the first and second critical sections in the flow graph;
   wherein the critical section ordering apparatus comprises (a) a dependence determination unit to determine a dependence relationship and to derive a dependence graph based at least in part on the dependence relationship, and (b) an ordering unit to summarize the dependence graph into a summarized dependence graph having a summarized node that includes multiple critical sections.

13. The apparatus of claim 12, wherein the code motions include a code sink motion and a code hoist motion.

14. The apparatus of claim 12, wherein the critical section ordering apparatus further comprises the dependence determination unit to determine the dependence relationship between the first and second critical sections in the source code based at least in part on the position information of the first and second critical sections in the flow graph.

15. The apparatus of claim 14, wherein the dependence determination unit further derives the dependence graph, which includes the first and second critical sections.

16. The apparatus of claim 15, wherein the critical section ordering apparatus further comprises the ordering unit to summarize the dependence graph and to decide the order between the first and second critical sections based on the summarized dependence graph.

17. The apparatus of claim 12, wherein the critical section ordering apparatus orders the first and second critical sections across multiple traces.

18. The article of claim 1, wherein the operations further comprise determining the dependence relationship between the first and second critical sections based on an assessment of whether a lowest possible beginning position for the first critical section is higher than a highest possible end position for the first critical section.

19. The article of claim 18, wherein the operations further comprise determining the dependence relationship between the first and second critical sections based on an assessment of whether the lowest possible beginning position for the first critical section is lower than the highest possible end position for the first critical section.

* * * * *